W. F. MacGREGOR.
PNEUMATIC STACKER.
APPLICATION FILED JUNE 14, 1909.
965,310.
Patented July 26, 1910.
2 SHEETS—SHEET 1.
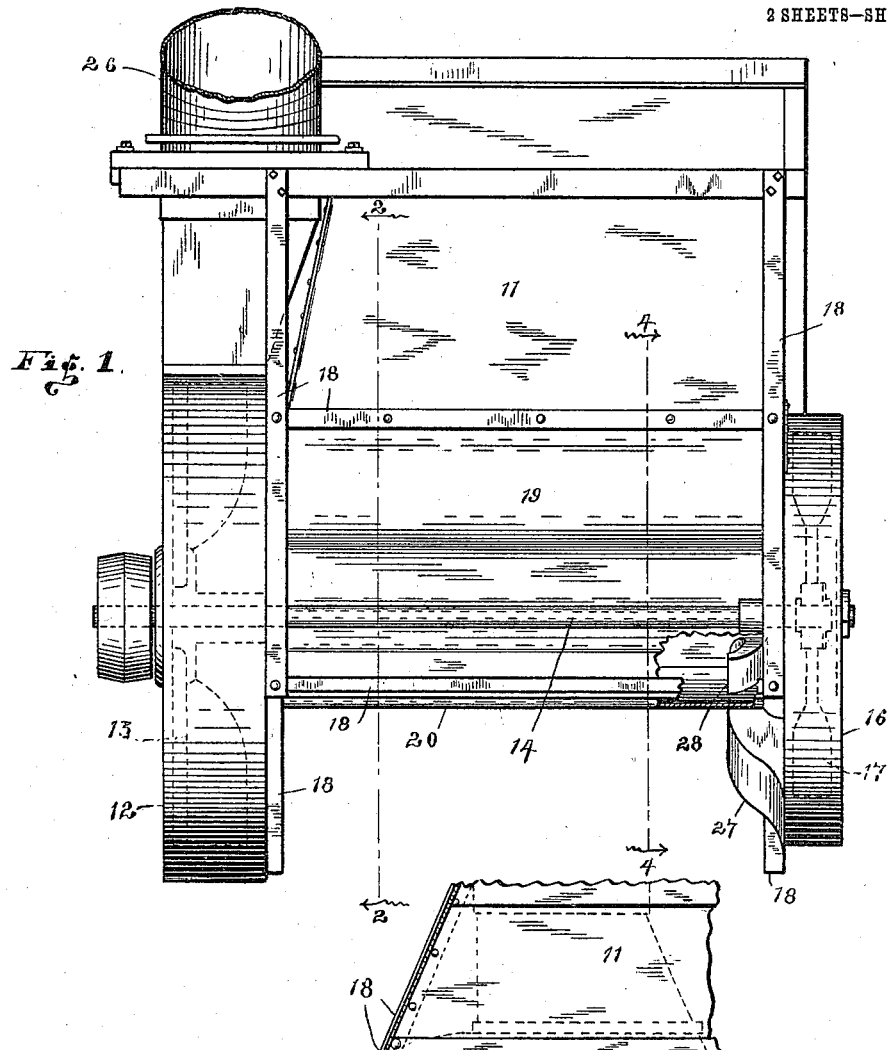
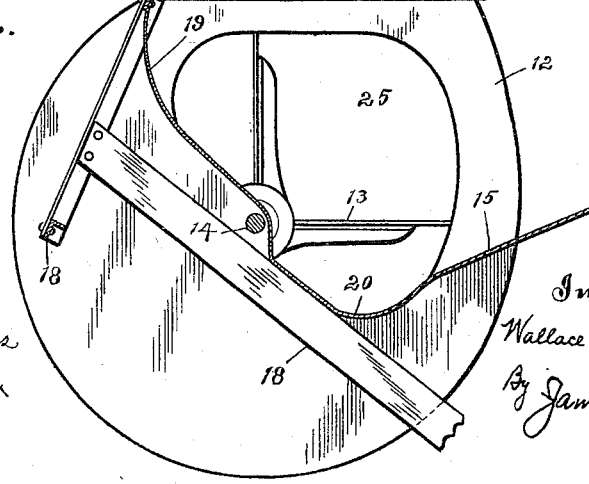
Witnesses:
Adelaide Kearns
Lee R. Garber
Inventor
Wallace F. MacGregor,
By James A. Walsh,
Attorney

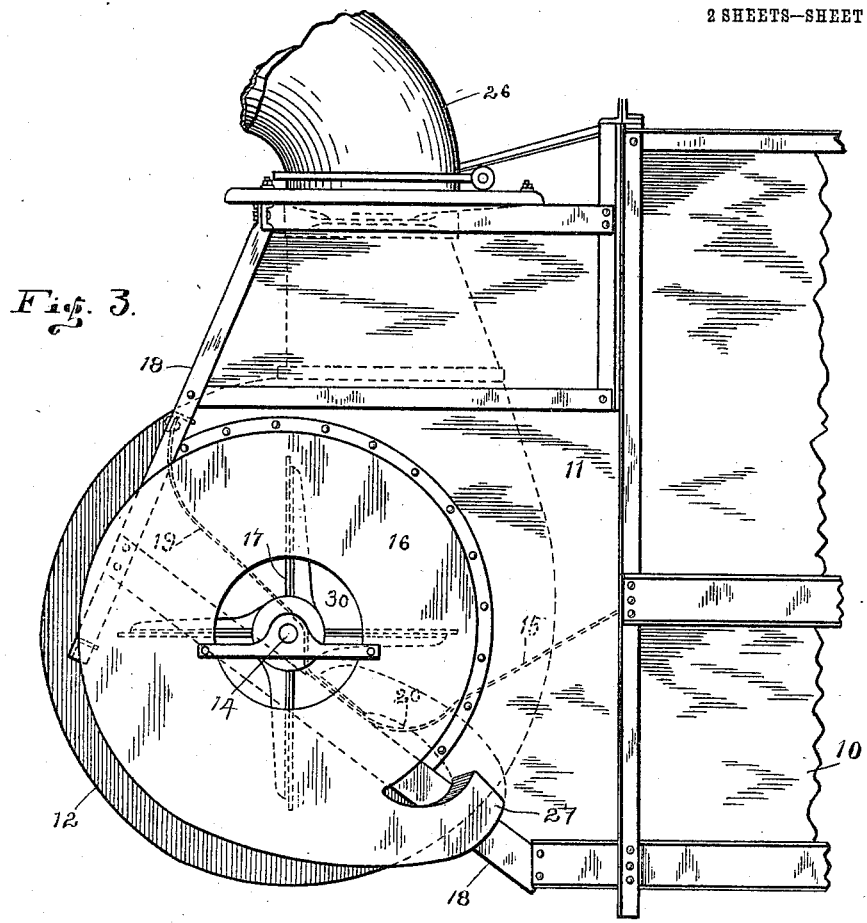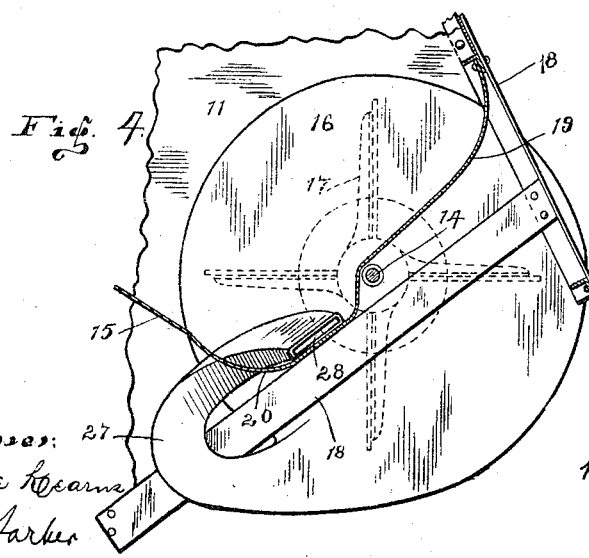

UNITED STATES PATENT OFFICE.

WALLACE F. MacGREGOR, OF RACINE, WISCONSIN, ASSIGNOR TO THE INDIANA MANUFACTURING COMPANY, OF INDIANAPOLIS, INDIANA, A CORPORATION OF WEST VIRGINIA.

PNEUMATIC STACKER.

965,310. Specification of Letters Patent. Patented July 26, 1910.

Application filed June 14, 1909. Serial No. 501,926.

*To all whom it may concern:*

Be it known that I, WALLACE F. MAC-GREGOR, a citizen of the United States, residing at Racine, in the county of Racine and State of Wisconsin, have invented certain new and useful Improvements in Pneumatic Stackers, of which the following is a specification.

My invention relates to that type of pneumatic stackers embodying a burden fan positioned at one side of the hopper or straw chamber, and an auxiliary fan in its opposite side for creating and discharging a blast toward said burden fan, which, with the intake suction air current created in the material-receiving hopper by the latter fan, produces a continuous blast draft entirely across said hopper, thus insuring that all material falling thereinto is instantly withdrawn and discharged by said burden fan, all as will be hereinafter more particularly described and claimed.

In the accompanying drawings, which form a part hereof, Figure 1 is a rear elevation of my improved stacker; Fig. 2, a detail sectional view thereof on the dotted line 2—2 in Fig. 1; Fig. 3, a side elevation of a separator in fragment with my improved stacker attached thereto; and Fig. 4 is a detail sectional view on the dotted line 4—4 in Fig. 1.

In said drawings the portions marked 10 represent a separating machine to which my improved stacker is designed to be attached. Said stacker comprises a straw-receiving chamber, 11, as usual, composed of side and end walls, with one of which side walls is associated a housing, 12, in which I mount a burden fan, 13, on a shaft, 14, running transversely across and beneath hopper, 15, to the opposite side thereof, at which side on said shaft in a suitable housing, 16, is mounted a blast fan, 17.

The horizontally arranged hopper 15 is of the form indicated most plainly in Fig. 2, and is supported by suitable braces 18. The rear portion, 19, of said hopper curves forwardly and downwardly over shaft 14, and then assumes a recessed or guttered formation, as 20, by which manner I am enabled to mount both fans 13 and 17 on the same shaft without passing the latter through the hopper, and I thus provide an unobstructed hopper through which material may be uninterruptedly discharged.

In fan housing 12 I provide an intake opening, 25, the lower portion of which conforms to the contour of the hopper, while the upper portion of said opening is gradually increased in width, forming in effect a cordiform intake opening, as indicated in Fig. 2, said opening beginning slightly to one side of the axis of fan 13 and occupying a position therebetween and the periphery of housing 12. Blast fan 17 receives its air supply directly from the exterior through a suitable opening, 30, and the blast created thereby is discharged through a suitable discharge duct, as 27, leading into hopper 15, which duct, as shown, may be twisted in form so that its mouth, 28, will communicate directly with hopper bottom 20.

In the operation of my improved stacker both the fans 13 and 17 are simultaneously driven by shaft 14, the rotation of fan 13 creating a suction intake current within a limited area in the hopper, while the blast discharging through the duct 27 passes principally along the guttered portion 20 of the hopper, but expands slightly toward the rear and front side thereof, which blast, meeting the intake current just referred to, becomes continuous entirely across the hopper, so that material falling in any part thereof is instantly and most effectively carried into the burden fan through opening 25, which opening by reason of its location and formation is capable of directing large masses of material such as straw and the like to the fan at a point where it is instantly withdrawn and carried to and discharged through the stacker chute 26 without making a complete circuit of the fan housing, as is common in stacker fans of ordinary types, and thus insuring that the material is ejected with a minimum amount of tearing or breakage.

I claim as my invention:

1. In a pneumatic stacker, the combination of a hopper, a burden fan at one side thereof, a blast fan at its opposite side, and a shaft positioned beneath said hopper and upon which said fans are mounted.

2. In a pneumatic stacker, a horizontally-arranged hopper having a recessed bottom, a burden fan at one side thereof having an intake opening between its axis and periphery, a shaft beneath said hopper upon which said burden fan is mounted, and a blast fan also mounted on said shaft at the side of said hopper opposite to said burden fan.

3. A pneumatic stacker comprising a hopper, a burden fan at one side of said hopper, a shaft beneath said hopper upon which said fan is mounted, a blast fan mounted on said shaft at the side of said hopper opposite to said burden fan, and a duct leading from said blast fan into said hopper to discharge an air blast thereacross.

4. In a pneumatic stacker, the combination of a burden fan having a cordiform intake opening, a hopper the lower portion of which conforms to the contour of said opening, a shaft upon which said fan is mounted, a blast fan mounted on said shaft at the side of said hopper opposite to said burden fan, and a duct leading from said blast fan into said hopper to discharge an air blast thereacross.

5. In a pneumatic stacker, a hopper having a guttered portion in its lower side, a burden fan at one side of said hopper having an intake opening between the axis and periphery of its casing, a blast fan at the opposite side of said hopper, a shaft upon which said fans are mounted, and a duct leading from said blast fan into said hopper to discharge an air blast thereacross.

In testimony whereof I affix my signature in presence of two witnesses.

WALLACE F. MACGREGOR.

Witnesses:
   A. B. THOMPSON,
   WM. F. SAWYER.